(12) United States Patent
Takei et al.

(10) Patent No.: US 12,281,708 B2
(45) Date of Patent: Apr. 22, 2025

(54) SEAL DEVICE

(71) Applicant: MITSUBISHI HEAVY INDUSTRIES, LTD., Tokyo (JP)

(72) Inventors: Norihisa Takei, Tokyo (JP); Hidekazu Uehara, Tokyo (JP); Takumi Hori, Tokyo (JP); Kohei Ozaki, Tokyo (JP); Azumi Yoshida, Tokyo (JP); Masaya Kawano, Tokyo (JP); Shin Nishimoto, Yokohama (JP); Tatsuro Furusho, Yokohama (JP); Shintaro Okumura, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 20 days.

(21) Appl. No.: 18/028,031

(22) PCT Filed: Sep. 14, 2021

(86) PCT No.: PCT/JP2021/033766
§ 371 (c)(1),
(2) Date: Mar. 23, 2023

(87) PCT Pub. No.: WO2022/113483
PCT Pub. Date: Jun. 2, 2022

(65) Prior Publication Data
US 2023/0341056 A1   Oct. 26, 2023

(30) Foreign Application Priority Data

Nov. 25, 2020 (JP) .................. 2020-195479

(51) Int. Cl.
*F16J 15/44* (2006.01)
*F16J 15/447* (2006.01)
*F01D 11/02* (2006.01)

(52) U.S. Cl.
CPC .............. *F16J 15/447* (2013.01); *F01D 11/02* (2013.01); *F05D 2240/55* (2013.01)

(58) Field of Classification Search
CPC .... F16J 15/447; F16J 15/4472; F16J 15/4474; F16J 15/4476; F16J 15/4478; F01D 11/02; F05D 2240/55
See application file for complete search history.

(56) References Cited

U.S. PATENT DOCUMENTS 4,436,311 A * 3/1984 Brandon .................. F16J 15/46
                                                        277/416
5,395,124 A * 3/1995 Brandon ................ F16J 15/441
                                                        277/413
(Continued)

FOREIGN PATENT DOCUMENTS

DE    693 28 426    1/2001
DE    699 36 636    5/2008
(Continued)

OTHER PUBLICATIONS

International Search Report issued Nov. 2, 2021 in corresponding International (PCT) Patent Application No. PCT/JP2021/033766.
(Continued)

*Primary Examiner* — Eugene G Byrd
*Assistant Examiner* — L. Susmitha Koneru
(74) *Attorney, Agent, or Firm* — Wenderoth, Lind & Ponack, L.L.P.

(57) ABSTRACT

This seal device comprises: a movable seal ring arranged so as to be deformable in the radial direction, in a state of facing an outer peripheral surface of a rotor of a steam turbine capable of rotating around the axis; a first elastic member provided to each of end surfaces of the movable seal ring in the circumferential direction; and a second elastic member that is provided to an intermediate position in the circum-
(Continued)

ferential direction of the movable seal ring and urges the movable seal ring outward in the radial direction.

10 Claims, 4 Drawing Sheets

(56) References Cited

U.S. PATENT DOCUMENTS

| | | | | |
|---|---|---|---|---|
| 6,145,844 | A * | 11/2000 | Waggott | F16J 15/442 |
| | | | | 277/412 |
| 6,318,728 | B1 * | 11/2001 | Addis | F16J 15/3288 |
| | | | | 277/355 |
| 6,572,114 | B1 * | 6/2003 | Magoshi | F02C 7/28 |
| | | | | 277/411 |
| 6,588,764 | B2 * | 7/2003 | Fuller | F16J 15/442 |
| | | | | 277/421 |
| 6,976,680 | B2 * | 12/2005 | Uehara | F16J 15/3292 |
| | | | | 277/355 |
| 9,841,104 | B2 * | 12/2017 | Uehara | F16J 15/3292 |
| 10,954,959 | B2 * | 3/2021 | Yamada | F04D 29/286 |
| 2009/0196742 | A1 | 8/2009 | Turnquist et al. | |
| 2011/0068539 | A1 * | 3/2011 | Nakano | F01D 11/22 |
| | | | | 277/413 |
| 2012/0211944 | A1 * | 8/2012 | Nishimoto | F16J 15/442 |
| | | | | 277/422 |
| 2016/0186588 | A1 * | 6/2016 | Davis | F16J 15/067 |
| | | | | 277/592 |
| 2016/0377182 | A1 * | 12/2016 | Zitting | F16J 15/4478 |
| | | | | 277/402 |

FOREIGN PATENT DOCUMENTS

| | | |
|---|---|---|
| DE | 21 2011 100 145 | 8/2013 |
| EP | 1 061 237 | 12/2000 |
| JP | 4-93573 | 8/1992 |
| JP | 7-504485 | 5/1995 |
| JP | 11-257013 | 9/1999 |
| JP | 2000-097352 | 4/2000 |
| JP | 2002-349209 | 12/2002 |
| JP | 2002-364308 | 12/2002 |
| JP | 2013-148152 | 8/2013 |
| WO | 94/16250 | 7/1994 |
| WO | 2009/150905 | 12/2009 |

OTHER PUBLICATIONS

Written Opinion issued Nov. 2, 2021 in corresponding International (PCT) Patent Application No. PCT/JP2021/033766.

* cited by examiner

SEAL DEVICE

TECHNICAL FIELD

The present disclosure relates to a seal device.

This application claims the right of priority based on Japanese Patent Application No. 2020-195479 filed with the Japan Patent Office on Nov. 25, 2020, the content of which is incorporated herein by reference.

BACKGROUND ART

For example, in a rotary machine such as a steam turbine, a seal device is provided to prevent leakage of steam between the outer peripheral surface of a rotor and a casing (refer to PTL 1 below). This type of seal device mainly includes a seal ring that faces the outer peripheral surface of the rotor, a holder that supports the seal ring so as to be displaceable in a radial direction, and an elastic member provided between the holder and the seal ring. The seal ring generally has a semi-arcuate cross section to match the shape of the outer periphery of the rotor. During the operation of the steam turbine, the radial position of the seal zing is adjusted by achieving a balance between the pressure of the steam flowing on the inner periphery side of the seal ring and the pressure (back pressure) of compressed air that is supplied to the outer periphery side of the seal ring.

CITATION LIST

Patent Literature

[PTL 1] International Publication No. WO2009/150905

SUMMARY OF INVENTION

Technical Problem

In the seal device as described above, there is a case where the seal ring bends due to its own weight and the back pressure. More specifically, there is a case where the semi-arcuate seal ring is deformed to expand outward. If such deformation occurs, the amount of radial displacement of the seal ring is limited, and there is a concern that desired sealing performance may not be exhibited.

The present disclosure has been made to solve the above problem, and has an object to provide a seal device in which bending is suppressed, so that sealing performance is further improved.

Solution to Problem

In order to solve the above problem, a seal device according to the present disclosure includes: a movable seal ring disposed to be displaceable in a radial direction in a state of facing an outer peripheral surface of a rotor rotatable around an axis; a first elastic member provided at each of end surfaces in a circumferential direction of the movable seal ring; and a second elastic member that is provided at an intermediate position in the circumferential direction of the movable seal ring and that biases the movable seal ring outward in the radial direction.

A seal device according to the present disclosure includes: a movable seal ring disposed to be displaceable in a radial direction in a state of facing an outer peripheral surface of a rotor rotatable around an axis; and a first elastic member provided at each of end surfaces in a circumferential direction of the movable seal ring, in which the end surfaces in the circumferential direction of the movable seal ring spread in the radial direction when viewed from a direction of the axis, and the first elastic members bias the movable seal ring from both sides in the circumferential direction.

A seal device according to the present disclosure includes: a movable seal ring disposed to be displaceable in a radial direction in a state of facing an outer peripheral surface of a rotor rotatable around an axis; a first elastic member provided at each of end surfaces in a circumferential direction of the movable seal ring; a pressing part provided at an end portion in the circumferential direction of the movable seal ring and configured to press the first elastic member; and a restriction part that restricts displacement of the pressing part in a direction opposite to a compression direction in a state where the first elastic member is elastically deformed in the compression direction by the pressing part.

A seal device according to the present disclosure includes: a movable seal ring disposed to be displaceable in a radial direction in a state of facing an outer peripheral surface of a rotor rotatable around an axis; a first elastic member provided at each of end surfaces in a circumferential direction of the movable seal ring; and a fixed seal ring provided adjacent to the movable seal ring in the circumferential direction, in which a protrusion portion protruding toward the movable seal ring side is formed on an end surface in the circumferential direction of the fixed seal ring, and a sliding surface that slides on the protrusion portion is formed on the end surface in the circumferential direction of the movable seal ring.

Advantageous Effects of Invention

According to the present disclosure, it is possible to provide a seal device in which bending is suppressed, so that sealing performance is further improved.

DESCRIPTION OF EMBODIMENTS

First Embodiment (Configuration of Seal Device)

Hereinafter, a seal device 100 according to a first embodiment of the present disclosure will be described with reference to FIGS. 1 to 3. The seal device 100 is provided to prevent leakage of steam around a rotor 90 of a steam turbine, for example. The rotor 90 has a columnar shape extending along an axis O and is rotatable around the axis O.

Figure 1:
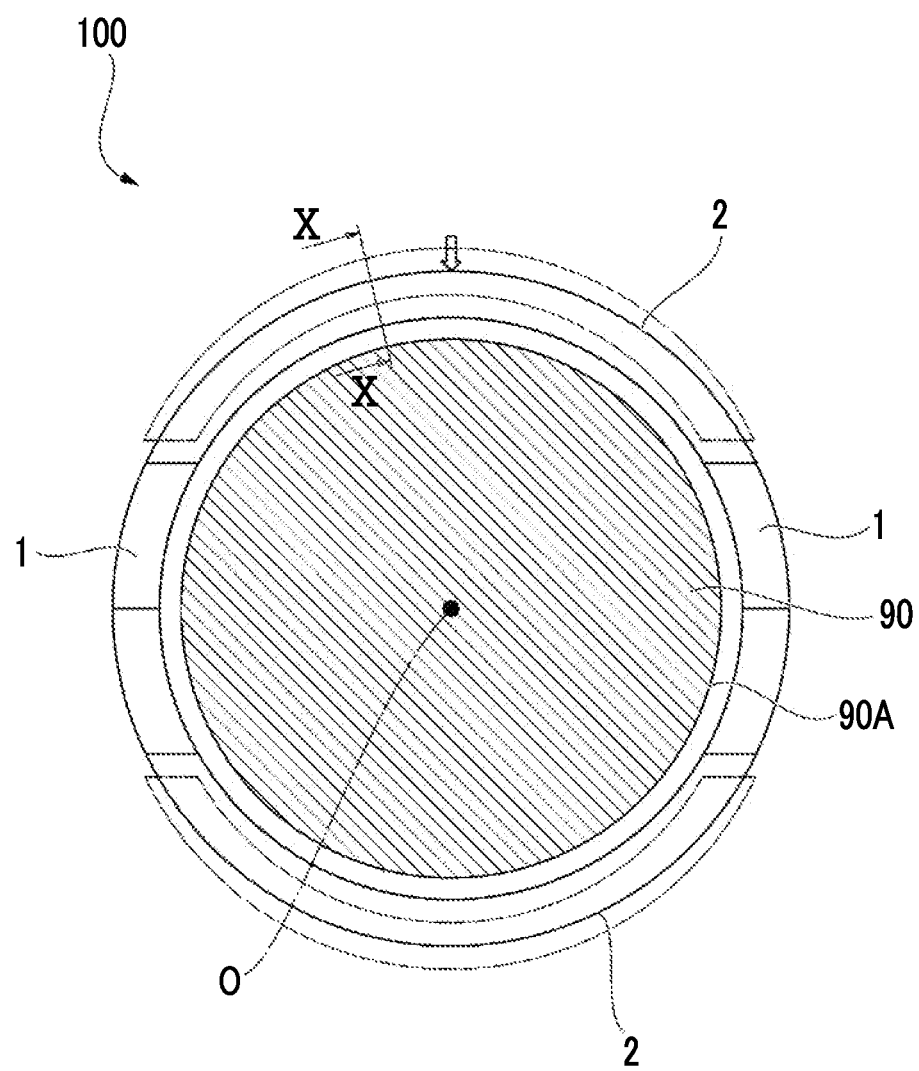
FIG. 1 is a cross-sectional view in a direction of an axis of a seal device according to a first embodiment of the present disclosure.
Figure 2:
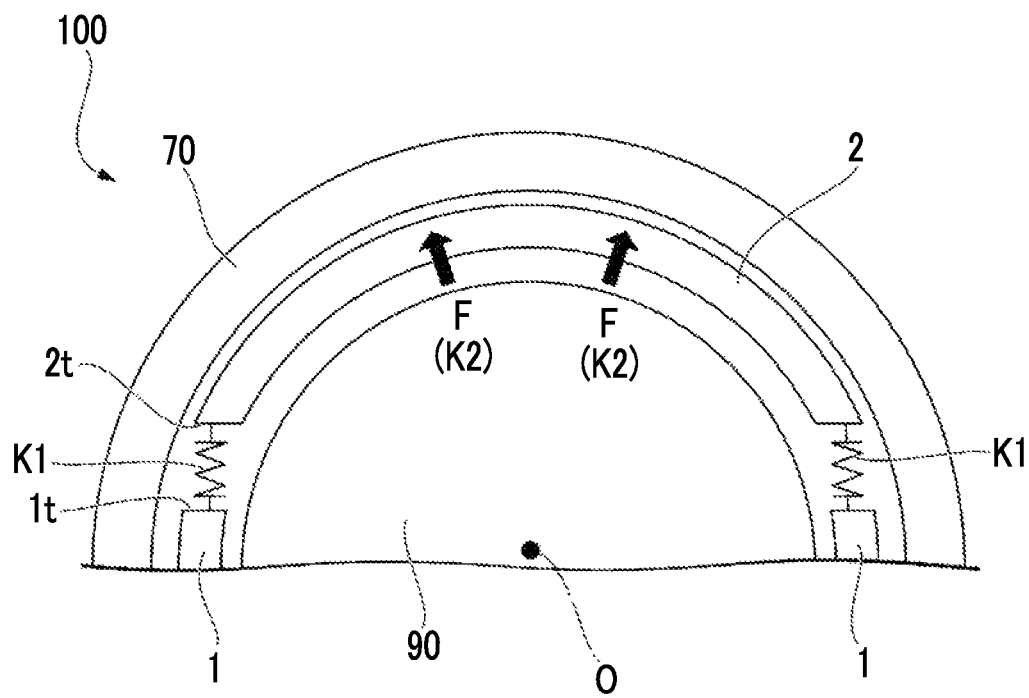
FIG. 2 is an explanatory diagram showing a distribution of loads that are applied to the seal device according to the first embodiment of the present disclosure.

As shown in FIG. 1 or 2, the seal device 100 includes two fixed seal zings 1, two movable seal rings 2, two first elastic members K1 (refer to FIG. 2), and two second elastic members K2 (refer to FIG. 2).

The fixed seal ring 1 faces a rotor outer peripheral surface 90A in a radial direction. The fixed seal ring 1 is supported on and fixed to a casing of a steam turbine. The fixed seal ring 1 has a seal body having a plurality of grooves facing a plurality of seal fine (not shown) provided on the rotor outer peripheral surface 90A. The fixed seal ring 1 exhibits a labyrinth effect due to insertion of the seal fins into the plurality of grooves.

The fixed seal ring 1 is supported in a state of being biased from a back surface toward a radial inner side of the rotor 90 by a leaf spring or the like. The fixed seal ring 1 is a seal member that is substantially immovable although it is displaceable when it is pressed outward in the radial direction due to the contact with the rotor 90.

The two movable seal rings 2 are disposed to face each other with the rotor 90 interposed therebetween. The movable seal ring 2 has an arc shape extending in a circumferential direction. The movable seal ring 2 is adjacent to the fixed seal ring 1 in the circumferential direction. An end portion 2t in the circumferential direction of the movable seal ring 2 can come into contact with an end portion it in the circumferential direction of the fixed seal ring 1 with the movement of the movable seal ring 2.

The length of the movable seal ring 2 in the circumferential direction is larger than the length of the fixed seal ring 1 in the circumferential direction. An angle formed by two straight lines connecting both ends in the circumferential direction of the movable seal ring 2 and the axis O is, for example, 120°. An angle formed by two straight lines connecting both ends in the circumferential direction of the fixed seal ring 1 and the axis O is, for example, 30°.

As shown in FIG. 2, the first elastic member K1 is provided between each of the end portions 2t in the circumferential direction of the movable seal ring 2 and each of the end portions it in the circumferential direction of the fixed seal ring 1. The first elastic member K1 is, for example, a disc spring. In the present embodiment, the end portion 1t and the end portion 2t spread in a horizontal plane. Therefore, the disc spring as the first elastic member K1 extends in an up-down direction.

Further, a plurality of (as an example, two) second elastic members K2 are provided at an intermediate position in the circumferential direction of the movable seal ring 2 (that is, in a region between the end portions 2t and 2t in the circumferential direction). More specifically, the second elastic members K2 are provided in a portion that includes a top portion (that is, the highest position) of the movable seal ring 2. The second elastic member K2 is also, for example, a disc spring, like the first elastic member K1. The second elastic member K2 biases the movable seal ring 2 outward in the radial direction. In FIG. 2, a biasing force by the second elastic member K2 is indicated by an arrow F. A method for selecting the second elastic member K2 is as follows. First, a supporting force at each supporting point in a case where a uniformly distributed load (a force due to its own weight and differential pressure) acts on the movable seal ring 2 is obtained. Next, a spring constant of the second elastic member K2 is set to a value proportional to the supporting force acting on each supporting point. At this time, since the force due to the own weight of the spring and the differential pressure is regarded as a uniformly distributed load, a ratio of the forces that are applied to the springs can be regarded as not changing regardless of the differential pressure. In this way, a magnitude of a preload by each of the elastic members (the first elastic member K1 and the second elastic member K2) becomes uniform.

Figure 3:
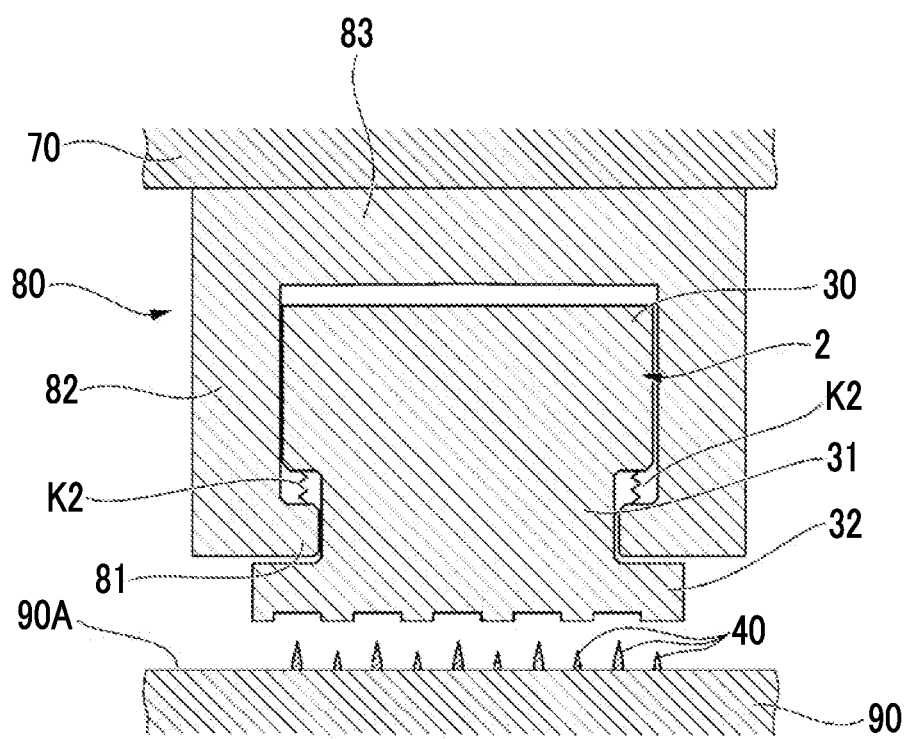
FIG. 3 is a sectional view taken along line X-X of FIG. 1.

More specifically, as shown in FIG. 3, the movable seal ring 2 is supported from the outside in the radial direction by a holder 80 provided on a casing 70 of the steam turbine. The holder 80 has a C-shaped cross section when viewed from the circumferential direction. The holder 80 includes a plate-shaped base portion 83 that is in contact with the casing 70, a pair of side portions 82 extending inward in the radial direction from both ends in a direction of the axis O of the base portion 83, and a pair of engaging portions 81 protruding in a direction to approach each other from end portions on the radial inner side of the side portions 82.

The movable seal ring 2 includes a head portion 30 inserted between the side portions 82 of the holder 80, a connecting portion 31 extending inward in the radial direction from the head portion 30, and a movable seal ring main body 32 integrally provided on an inner periphery side of the connecting portion 31. The head portion 30 is displaceable in the radial direction between the base portion 83 and the engaging portion 31 inside the holder 80. The second elastic member K2 described above is provided between an end surface on the inner periphery side of the head portion 30 and the engaging portion 81. Further, for example, compressed air is supplied to an outer periphery side of the head portion 30. A position in the radial direction of the movable seal ring 2 is changed due to pressure of the compressed air (back pressure).

The connecting portion 31 is inserted between the engaging portions 81. That is, a dimension of the connecting portion 31 in the direction of the axis O is smaller than a dimension of the head portion 30 in the direction of the axis O. The movable seal ring main body 32 protrudes inward in the radial direction with respect to the engaging portion 81. An inner peripheral surface of the movable seal ring main body 32 forms a constant clearance between itself and seal fins 40 arranged on the rotor outer peripheral surface 90A.

(Operation and Effect)

Here, in the seal device 100 as described above, there is a case where in particular, the movable seal ring 2 located on an upper side bends due to its own weight and the back pressure. More specifically, there is a case where the semi-arcuate movable seal ring 2 is deformed so as to expand outward. If such deformation occurs, the amount of radial displacement of the movable seal ring 2 is limited, so that there is a concern that the desired sealing performance may not be exhibited.

However, according to the above configuration, the movable seal ring 2 is supported by the second elastic member K2 in addition to the first elastic member K. The second elastic member K2 biases the movable seal ring 2 outward in the radial direction at the intermediate position in the circumferential direction. In this way, it is possible to suppress bending of the movable seal ring 2 due to its own weight or to the pressure of a fluid that is supplied from the outer periphery side (the back pressure). More specifically, it is possible to suppress the movable seal ring 2 from being deformed so as to expand outward. In this way, it becomes possible to further improve the sealing performance of the seal device 100.

Second Embodiment

Figure 4:
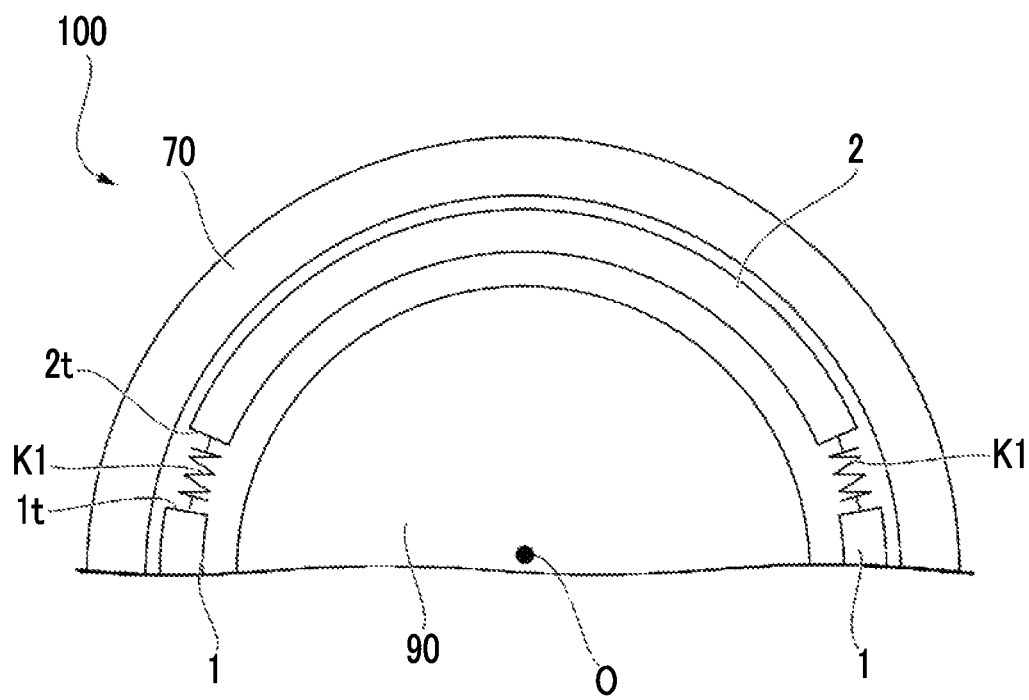
FIG. 4 is a cross-sectional view in a direction of an axis of a seal device according to a second embodiment of the present disclosure.

Next, a second embodiment of the present disclosure will be described with reference to FIG. 4. The same configurations as in the first embodiment described above are denoted by the same reference numerals, and detailed description thereof is omitted. As shown in FIG. 4, in the present embodiment, the end portion it (the end surface) in the circumferential direction of the fixed seal ring 1 and the end portion 2t (the end surface) in the circumferential direction of the movable seal ring 2 spread in the radial direction with respect to the axis O when viewed from the direction of the axis O. Further, a compression coil spring as the first elastic member K1 is disposed between the end portion it and the end portion 2t. Since the end portion 1t and the end portion 2t spread in the radial direction, the first elastic member K1 connects the fixed seal ring 1 and the movable seal ring 2 in the circumferential direction with respect to the axis O. That is, the first elastic members K1 bias the movable seal ring 2 from both sides in the circumferential direction.

According to the above configuration, the end surfaces (the end portions 2t) in the circumferential direction of the movable seal ring 2 spread in the radial direction and are biased from both sides in the circumferential direction by the first elastic members K1. In this way, a state is created in which a compressive force is applied to the movable seal ring 2 toward the center in the circumferential direction. As a result, it is possible to further suppress the bending of the movable seal zing 2.

Third Embodiment

Figure 5:
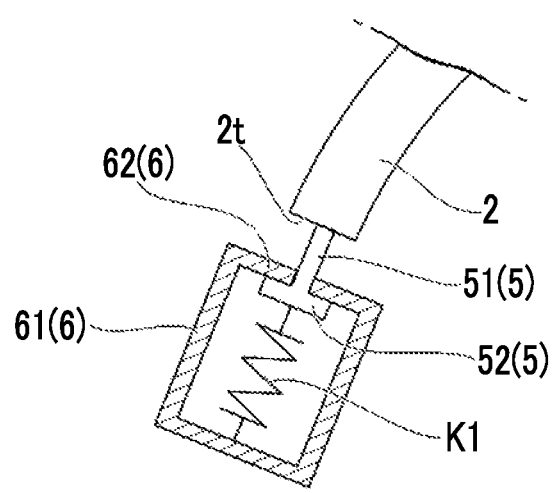
FIG. 5 is a cross-sectional view showing a configuration of an end portion of a movable seal ring according to a third embodiment of the present disclosure.

Subsequently, a third embodiment of the present disclosure will be described with reference to FIG. 5. The same configurations as in each of the embodiments described above are denoted by the same reference numerals, and detailed description thereof is omitted. As shown in FIG. 5, in the present embodiment, a pressing part 5 is mounted to the end portion 2t in the circumferential direction of the movable seal ring 2. The pressing part 5 has a rod-shaped extending portion 51 that protrudes in the circumferential direction from the end portion 2t, and a plate-shaped pressing part main body 52 provided at an end portion of the extending portion 51.

The pressing part 5 is surrounded by a case 6 fixed to the fixed seal ring 1 (not shown in FIG. 5). The case 6 has a box-shaped case main body 61 and a restriction part 62 that is an end surface on one side in the circumferential direction of the case main body 61. The restriction part 62 is formed with an opening through which the extending portion 51 is inserted. The pressing part main body 52 is biased in the circumferential direction (compression direction) by the first elastic member K1 provided inside the case 6 in a state of being located on an inner side with respect to the restriction part 62. The first elastic member K1 is preliminarily compressed to be in a state of being elastically deformed. That is, a preload is applied to the first elastic member K1. At this time, the displacement of the movable seal ring 2 (that is, the displacement in a direction opposite to the compression direction) is restricted by the contact between the pressing part 5 and the restriction part 62. On the other hand, in a case where a load on the movable seal ring 2 exceeds a preload value, the movable seal ring 2 can be displaced in the compression direction.

According to the above configuration, the first elastic member K1 is pressed by the pressing part 5 to be in a state where it has been elastically deformed in the compression direction. In this state, the restriction part 62 restricts the displacement of the pressing part 5 in the direction opposite to the compression direction. That is, a compressive load is applied in advance to the first elastic member K1. In this way, the radial displacement of the movable seal ring 2 is restricted until a load having a magnitude that offsets the compressive load is applied. As a result, it becomes possible to precisely control a timing at which the movable seal ring 2 starts to be displaced, only by changing the magnitude of the compressive load.

Fourth Embodiment 1

Figure 6:
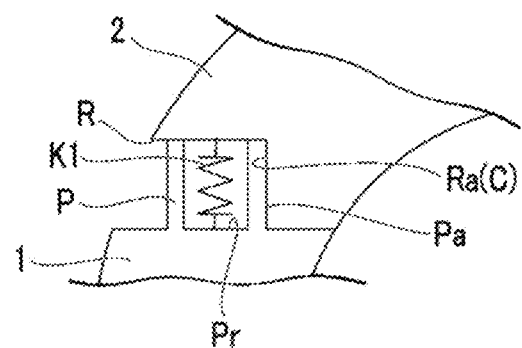
FIG. 6 is an enlarged sectional view of a main part of a seal device according to a fourth embodiment of the present disclosure.

Next, a fourth embodiment of the present disclosure will be described with reference to FIG. 6. The same configurations as in each of the embodiments described above are denoted by the same reference numerals, and detailed description thereof is omitted. As shown in FIG. 6, in the present embodiment, the configuration of the connecting portion between the fixed seal ring 1 and the movable seal ring 2 is different from that in each of the embodiments described above. In the present embodiment, the end portion of the fixed seal ring 1 is provided with a protrusion portion P that protrudes toward the movable seal ring 2 side. An accommodation recess portion Pr that accommodates the first elastic member K1 described above is formed inside the protrusion portion P. A surface facing radially inward (on the inner periphery side) of the outer surface of the protrusion portion P is referred to as a facing surface Pa.

On the other hand, the end portion of the movable seal ring 2 is formed with a recess portion R that is recessed to a side away from the fixed seal ring 1. The recess portion R has a shape and dimensions corresponding to those of the protrusion portion P. That is, the fixed seal ring 1 and the movable seal ring 2 can be engaged with each other through the protrusion portion P and the recess portion R. A surface facing radially outward of the recess portion R is referred to as a sliding surface Ra. The sliding surface Ra slides on the facing surface Pa when the movable seal ring 2 is displaced with respect to the fixed seal ring 1. A coating C as a low-friction part for reducing the frictional force between the sliding surface Ra and the facing surface Pa is applied to the sliding surface Pa.

According to the above configuration, the sliding surface Ra of the movable seal ring 2 is in slidable contact with the surface facing the inner periphery side (the facing surface Pa) of the protrusion portion P of the fixed seal ring 1. That is, the movable seal ring 2 is clamped from the outside by the protrusion portions P on both sides in the circumferential direction. In this way, it is possible to further suppress the occurrence of the bending (bending accompanied by deformation such as outward expanding) of the movable seal ring 2 due to its own weight or to the back pressure.

Further, according to the above configuration, the coating C as a low-friction part is provided, so that a frictional force is reduced even in a case where a load that causes displacement is applied to the movable seal ring 2. Therefore, it is possible to suppress the displacement from being hindered.

Other Embodiments

The embodiments of the present disclosure have been described in detail above with reference to the drawings. However, the specific configurations are not limited to these embodiments, and also include design changes and the like within a scope which does not depart from the gist of the present disclosure.

Figure 7:
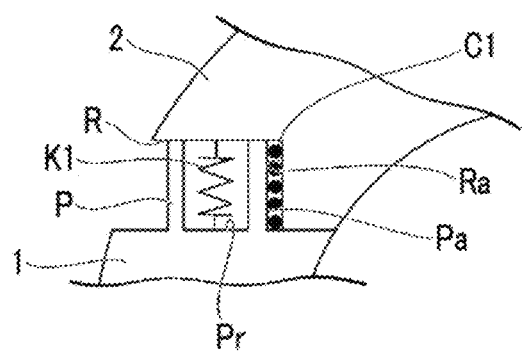
FIG. 7 is an enlarged sectional view of a main part showing a modification example of the seal device according to the fourth embodiment of the present disclosure.
Figure 8:
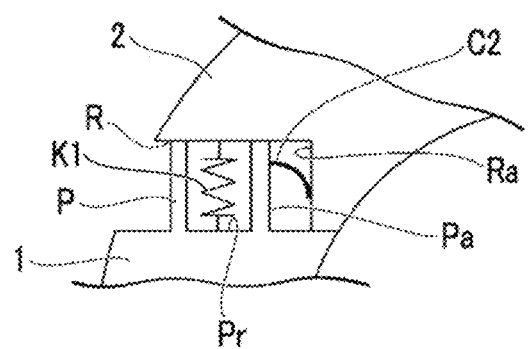
FIG. 8 is an enlarged sectional view of a main part showing another modification example of the seal device according to the fourth embodiment of the present disclosure.

For example, in the fourth embodiment, the configuration in which the sliding surface Ra is provided with the coating C as the low-friction part has been described. However, the aspect of the low-friction part is not limited to this, and it is also possible to adopt the configuration shown in FIG. 7 or 8. In the modification example shown in FIG. 7, as the low-friction part, a plurality of rollers C1 are disposed on the sliding surface Ra. The rollers C1 roll at the time of the displacement of the movable seal ring 2, so that the frictional force between the sliding surface Ra and the facing surface Pa can be reduced. Further, in the modification example shown in FIG. 8, as the low-friction part, a leaf spring C2 is provided on the facing surface Pa side. A tip of the leaf spring C2 is in contact with the sliding surface Ra. When the movable seal ring 2 is displaced, the leaf spring C2 slides on the sliding surface Pa while being elastically deformed, so that the frictional force between the sliding surface Ra and the facing surface Pa can be reduced.

Additional Remarks

The seal device 100 described in each embodiment is understood as follows, for example.

(1) A seal device 100 according to a first aspect includes: the movable seal ring 2 disposed to be displaceable in the radial direction in a state of facing the outer peripheral surface 90A of the rotor 90 rotatable around the axis O; the first elastic member K1 provided at each of the end surfaces in the circumferential direction of the movable seal ring 2; and the second elastic member K2 that is provided at an intermediate position in the circumferential direction of the movable seal ring 2 and that biases the movable seal ring 2 outward in the radial direction.

According to the above configuration, the movable seal ring 2 is supported by the second elastic member K2 in addition to the first elastic member K1. The second elastic member K2 biases the movable seal ring 2 outward in the radial direction at the intermediate position in the circumferential direction. In this way, it is possible to suppress bending of the movable seal ring 2 due to its own weight or to the pressure of a fluid that is supplied from the outer periphery side (the back pressure). More specifically, it is possible to suppress the movable seal ring 2 from being deformed so as to expand outward.

(2) In a seal device 100 according to a second aspect, the end surfaces in the circumferential direction of the movable seal ring 2 may spread in the radial direction when viewed from the direction of the axis O, and the first elastic members K1 may bias the movable seal ring 2 from both sides in the circumferential direction.

According to the above configuration, the end surfaces in the circumferential direction of the movable seal ring 2 spread in the radial direction and axe biased from both sides in the circumferential direction by the first elastic members K1. In this way, a state is created in which a compressive force is applied to the movable seal ring 2 toward the center in the circumferential direction. As a result, it is possible to further suppress the bending of the movable seal ring 2.

(3) A seal device 100 according to a third aspect may further include: the pressing part 5 provided at an end portion in the circumferential direction of the movable seal ring 2 and configured to press the first elastic member K1; and the restriction part 62 that restricts displacement of the pressing part 5 in a direction opposite to a compression direction in a state where the first elastic member K1 is elastically deformed in the compression direction by the pressing part 5.

According to the above configuration, the first elastic member K1 is pressed by the pressing part 5 to be in a state where it has been elastically deformed in the compression direction. In this state, the restriction part 62 restricts the displacement of the pressing part 5 in the direction opposite to the compression direction. That is, a compressive load is applied in advance to the first elastic member K1. In this way, the radial displacement of the movable seal ring 2 is restricted until a load having a magnitude that offsets the compressive load is applied. As a result, it becomes possible to precisely control a timing at which the movable seal ring 2 starts to be displaced, only by changing the magnitude of the compressive load.

(4) A seal device 100 according to a fourth aspect may further include: the fixed seal ring 1 provided adjacent to the movable seal ring 2 in the circumferential direction, in which the protrusion portion P protruding toward the movable seal ring 2 side is formed on an end surface in the circumferential direction of the fixed seal ring 1, and the sliding surface Pa that slides on the surface facing the inner periphery side of the protrusion portion P is formed on the end surface in the circumferential direction of the movable seal ring 2.

According to the above configuration, the sliding surface Ra of the movable seal ring 2 is in slidable contact with the surface facing the inner periphery side of the protrusion portion P of the fixed seal ring 1. That is, the movable seal ring 2 is clamped from the outside by the protrusion portions P on both sides in the circumferential direction. In this way, it is possible to further suppress the occurrence of the bending (bending accompanied by deformation such as outward expanding) of the movable seal ring 2 due to its own weight or to the back pressure.

(5) A seal device 100 according to a fifth aspect may further include: a low-friction part provided on the sliding surface Ra to reduce a frictional force between the sliding surface Ra and the protrusion portion P.

According to the above configuration, the low-friction part is provided, so that a frictional force is reduced even in a case where a load that causes displacement is applied to the movable seal ring 2. Therefore, it is possible to suppress the displacement from being hindered.

(6) A seal device 100 according to a sixth aspect includes: the movable seal ring 2 disposed to be displaceable in the radial direction in a state of facing the outer peripheral surface 90A of the rotor 90 rotatable around the axis O; and the first elastic member K1 provided at each of the end surfaces in the circumferential direction of the movable seal ring 2, in which the end surfaces in the circumferential direction of the movable seal ring 2 spread in the radial direction when viewed from the direction of the axis O, and the first elastic members K1 bias the movable seal ring 2 from both sides in the circumferential direction.

According to the above configuration, the end surfaces in the circumferential direction of the movable seal ring 2 spread in the radial direction and are biased from both sides in the circumferential direction by the first elastic members K1. In this way, a state is created in which a compressive force is applied to the movable seal ring 2 toward the center in the circumferential direction. As a result, it is possible to further suppress the occurrence of the bending of the movable seal ring.

(7) A seal device 100 according to a seventh aspect includes: the movable seal ring 2 disposed to be displaceable in the radial direction in a state of facing the outer peripheral surface 90A of the rotor 90 rotatable around the axis O; the first elastic member K1 provided at each of the end surfaces in the circumferential direction of the movable seal ring 2; the pressing part 5 provided at an end portion in the circumferential direction of the movable seal ring 2 and configured to press the first elastic member K1; and the restriction part 62 that restricts displacement of the pressing part 5 in a direction opposite to a compression direction in a state where the first elastic member K1 is elastically deformed in the compression direction by the pressing part 5.

According to the above configuration, the first elastic member K1 is pressed by the pressing part 5 to be in a state where it has been elastically deformed in the compression direction. In this state, the restriction part 62 restricts the displacement of the pressing part 5 in the direction opposite to the compression direction. That is, a compressive load is applied in advance to the first elastic member K1. In this way, the radial displacement of the movable seal ring 2 is restricted until a load having a magnitude that offsets the compressive load is applied. As a result, it becomes possible to precisely control a timing at which the movable seal ring 2 starts to be displaced, only by changing the magnitude of the compressive load.

(8) A seal device 100 according to an eighth aspect includes: the movable seal ring 2 disposed to be displaceable in the radial direction in a state of facing the outer peripheral surface 90A of the rotor 90 rotatable around the axis O; the first elastic member K1 provided at each of the end surfaces in the circumferential direction of the movable seal ring 2; and the fixed seal ring 1 provided adjacent to the movable seal ring 2 in the circumferential direction, in which the protrusion portion P protruding toward the movable seal ring 2 side is formed on the end surface in the circumferential direction of the fixed seal ring 1, and the sliding surface Ra that slides on the protrusion portion P is formed on the end surface in the circumferential direction of the movable seal ring 2.

According to the above configuration, the sliding surface Pa of the movable seal ring 2 is in slidable contact with the surface facing the inner periphery side of the protrusion portion P of the fixed seal ring 1. That is, the movable seal ring 2 is clamped from the outside by the protrusion portions P on both sides in the circumferential direction. In this way, it is possible to further suppress the occurrence of the bending (bending accompanied by deformation such as outward expanding) of the movable seal ring 2 due to its own weight or to the back pressure.

(9) A seal device 100 according to a ninth aspect may further include: a low-friction part provided on the sliding surface Ra to reduce a frictional force between the sliding surface Ra and the protrusion portion P.

According to the above configuration, the low-friction part is provided, so that a frictional force is reduced even in a case where a load that causes displacement is applied to the movable seal ring 2. Therefore, it is possible to suppress the displacement from being hindered.

INDUSTRIAL APPLICABILITY

According to the present disclosure, it is possible to provide a seal device in which bending is suppressed, so that sealing performance is further improved.

REFERENCE SIGNS LIST

100: Seal device
1: Fixed seal ring
1t: End portion
2: Movable seal ring
2t: End portion
5: Pressing part
6: Case
30: Head portion
31: Connecting portion
32: Movable seal ring main body
40: Seal fin
51: Extending portion
52: Pressing part main body
61: Case main body
62: Restriction part
70: Casing
80: Holder
81: Engaging portion
82: Side portion
83: Base portion
90: Rotor
90A: Rotor outer peripheral surface
C: Coating
C1: Roller
C2: Leaf spring
K1: First elastic member
K2: Second elastic member
P: Protrusion portion
Pa: Facing surface
Pr: Accommodation recess portion
R: Recess portion
Ra: Sliding surface

The invention claimed is:

1. A seal device comprising:
a movable seal ring disposed to be displaceable in a radial direction in a state of facing an outer peripheral surface of a rotor rotatable around an axis;
first elastic members provided respectively at each of two end surfaces in a circumferential direction of the movable seal ring;
a pressing part provided at an end portion in the circumferential direction of the movable seal ring and configured to press one of the first elastic members; and
a restriction part that restricts displacement of the pressing part in a direction opposite to a compression direction in a state where the one of the first elastic members is elastically deformed in the compression direction by the pressing part,
wherein at least a part of the pressing part protrudes from the end portion of the movable seal ring in the circumferential direction of the movable seal ring.

2. A seal device comprising: a movable seal ring disposed to be displaceable in a radial direction in a state of facing an outer peripheral surface of a rotor rotatable around an axis; first elastic members provided respectively at each of two end surfaces in a circumferential direction of the movable seal ring; and a fixed seal ring provided adjacent to the movable seal ring in the circumferential direction,
wherein a protrusion portion is formed on an end surface in the circumferential direction of the fixed seal ring, the protrusion portion extending from the end surface in the circumferential direction of the fixed seal ring toward the movable seal ring,
a sliding surface that slides on the protrusion portion is formed on the end surface in the circumferential direction of the movable seal ring, and
the protrusion portion includes an accommodation recess portion that accommodates one of the first elastic members and is formed inside the protrusion portion.

3. The seal device according to claim 2, further comprising:
a low-friction part provided on the sliding surface to reduce a frictional force between the sliding surface and the protrusion portion.

4. The seal device according to claim 1, further comprising:
a second elastic member that is provided at an intermediate position in the circumferential direction of the movable seal ring and that biases the movable seal ring outward in the radial direction.

5. The seal device according to claim 1, wherein the two end surfaces in the circumferential direction of the movable seal ring spread in the radial direction when viewed from a direction of the axis, and
the first elastic members bias the movable seal ring from both sides in the circumferential direction.

6. The seal device according to claim 1, further comprising:
a fixed seal ring provided adjacent to the movable seal ring in the circumferential direction,
wherein a protrusion portion protruding toward the movable seal ring side is formed on an end surface in the circumferential direction of the fixed seal ring, and
a sliding surface that slides on the protrusion portion is formed on the end surface in the circumferential direction of the movable seal ring.

7. The seal device according to claim 6, further comprising:
a low-friction part provided on the sliding surface to reduce a frictional force between the sliding surface and the protrusion portion.

8. The seal device according to claim 2, further comprising:
a second elastic member that is provided at an intermediate position in the circumferential direction of the movable seal ring and that biases the movable seal ring outward in the radial direction.

9. The seal device according to claim 2, wherein the two end surfaces in the circumferential direction of the movable seal ring spread in the radial direction when viewed from a direction of the axis, and
the first elastic members bias the movable seal ring from both sides in the circumferential direction.

10. The seal device according to claim 2, further comprising:
a pressing part provided at an end portion in the circumferential direction of the movable seal ring and configured to press one of the first elastic members; and
a restriction part that restricts displacement of the pressing part in a direction opposite to a compression direction in a state where the one of the first elastic members is elastically deformed in the compression direction by the pressing part.

* * * * *